(12) United States Patent
Ussing

(10) Patent No.: US 8,637,285 B2
(45) Date of Patent: Jan. 28, 2014

(54) GENERATION OF PULSATING PRESSURE WAVES, E.G. FOR CELL LYSIS

(75) Inventor: Tomas Ussing, Copenhagen K (DK)

(73) Assignee: Memsflow ApS, Taastrup (DK)

( * ) Notice: Subject to any disclaimer, the term of this patent is extended or adjusted under 35 U.S.C. 154(b) by 1088 days.

(21) Appl. No.: 11/722,875

(22) PCT Filed: Dec. 23, 2005

(86) PCT No.: PCT/DK2005/000825
§ 371 (c)(1), (2), (4) Date: Jun. 19, 2008

(87) PCT Pub. No.: WO2006/069577
PCT Pub. Date: Jul. 6, 2006

(65) Prior Publication Data
US 2008/0305467 A1    Dec. 11, 2008

(30) Foreign Application Priority Data

Dec. 31, 2004   (DK) ............................. PA 2004 02034
Apr. 6, 2005    (DK) ............................. PA 2005 00484

(51) Int. Cl.
*C12Q 1/00* (2006.01)
*C12N 13/00* (2006.01)

(52) U.S. Cl.
USPC ................ 435/173.7; 435/173.1; 435/29

(58) Field of Classification Search
None
See application file for complete search history.

(56) References Cited

U.S. PATENT DOCUMENTS 6,156,576 A * 12/2000 Allbritton et al. ............. 436/63
2002/0045246 A1   4/2002 McMillan et al.
2003/0096429 A1   5/2003 Baeummer et al.

FOREIGN PATENT DOCUMENTS

JP   2002/505856       2/2002
WO   WO 99/45372       9/1999
WO   WO 2004/016948 A1 2/2004

OTHER PUBLICATIONS

Suslick, K. The Chemical Effects of Ultrasound. Scientific American Feb. 1989 pp. 80-89.*
Suslick, K. (1989) Scientific American, Feb. 1989, pp. 80-86.*
Suslick et al. (2008) Annu. Rev. Phys. Chem. 59: 659-83.*
Office Action Japanese Patent Application No. JP 2007-548693 dated May 10, 2011.
Christopher E. Sims et al., "Laser-Micropipet Combination for Single-Cell Analysis", Anal. Chem. 1998, 70, p. 4570-4577.

* cited by examiner

*Primary Examiner* — Chris R Tate
*Assistant Examiner* — Russell Fiebig
(74) *Attorney, Agent, or Firm* — Foley & Lardner LLP

(57) ABSTRACT

The present invention relates to a method by which a controlled source of heat (preferably a laser 3) generates a pulsating vapor bubble 4 in an enclosed liquid. The pulsating rate (the frequency) is preferably in the ultrasonic region, whereby cavitation occurs in the liquid. The cavitation effect will cause disruption of suspended components such as cells or bacterial spores. The ultrasonic disruption of cellular components is known as lysing by sonication.

13 Claims, 3 Drawing Sheets

GENERATION OF PULSATING PRESSURE WAVES, E.G. FOR CELL LYSIS

CROSS REFERENCE TO RELATED APPLICATION

This application claims the benefit and priority to and is a U.S. National Phase of PCT International Application Number PCT/DK2005/000825, filed on Dec. 23, 2005, designating the United States of America and published in the English language, which claims priority under 35 U.S.C. §119 to Danish Application Number PA 2004 02034 filed on Dec. 31, 2004, and Danish Application Number PA 2005 00484 filed on Apr. 6, 2005. The disclosures of the above-referenced applications are hereby expressly incorporated by reference in their entireties.

FIELD OF THE INVENTION

The present invention relates to a method by which a controlled source of heat (preferably a laser) generates a pulsating vapour bubble in a liquid. The pulsating rate (the frequency) is preferably in the ultrasonic region and with a substantial pressure, whereby cavitation occurs in the liquid. The cavitation effect will cause disruption of suspended components such as cells or bacterial spores. The ultrasonic disruption of cellular components is known as lysing by sonication.

BACKGROUND

When testing biochemical components such as cells or bacterial spores the substances of interest (e.g. DNA, RNA, haemoglobin, protein etc.) must be extracted from said cells or spores in which they are contained and thus shielded from direct access by chemicals, enzymes or direct measurement. The method of disrupting cell membranes or bacterial spore walls is known as lysing. One method of lysing is to apply a lysing agent, capable of chemically breaking open or dissolving said membrane or wall. Other methods involve mechanical methods like grinding (e.g. "French press") or repeated steps of freezing and thawing where crystallisation will cause physical rupture of cell walls.

One common method of lysing is that of sonication. Sonication involves exposing cells or spores in suspension to ultrasound. The liquid media (most often aqueous) in which cells or spores are suspended will act as a carrier of ultrasonic energy. If the pressures involved are of a substantial magnitude, cavitation in the liquid will occur. Cavitation involves the formation—respectively collapse, of high-pressure micro bubbles. The formation and subsequent collapse of micro bubbles will cause disrupting shear forces in the liquid media and as such around the cells or spores contained herein, ultimately breaking open membranes and walls and freeing the contents.

SUMMARY OF THE INVENTION

An object of the present invention is to provide a method of generating a pulsating pressure wave (PPW) in a liquid, which liquid may be comprised by a micro channel or a micro chamber, by means of an internally generated transducer, i.e. without having a mechanical interface to an external PPW transducer, such as an external ultrasound horn or a piezo electric transducer.

Another object of the present invention is to provide a method of generating a PPW in a liquid, which liquid may be comprised by a micro channel or a micro chamber, which PPW causes cavitation in the liquid.

Yet another object of the present invention is to provide a method of lysing one or more cells in a liquid, which liquid may be comprised by a micro channel or a micro chamber.

Still another object of the present invention is to provide a method of deagglomerating one or more cells in a liquid, which liquid may be comprised by a micro channel or a micro chamber.

A further object of the invention is to provide a simple method of lysing cells and preferably a method that is also compatible with or may contribute to further steps of analysing the components of the lysed cells.

Yet a further object of the invention is to provide method of generating a local, i.e. a spatially limited, PPW in a liquid, e.g. to obtain local cavitation and/or local lysing of cells; or to obtain local deagglomeration of particles.

Other objects of the invention will become apparent when reading the description and the examples.

Thus, an aspect of the present invention relates to a method for generating a pulsating pressure wave (PPW) in a liquid, the method comprising the steps of:
 a) providing a heating means,
 b) heating a part of the liquid with said heating means so as to evaporate the part of the liquid, thus forming a vapour bubble,
 c) condensing, either partly or fully, the vapour bubble, and
 d) repeating steps b) and c).

Preferably, the PPW is an ultrasonic wave.

Another aspect of the present invention relates to a method of lysing a biological cell in a liquid, the method comprising generating a PPW in the liquid.

Yet an aspect of the invention relates to a method for deagglomerating particles in a liquid, the method comprising generating a PPW in the liquid.

BRIEF DESCRIPTION OF THE FIGURES

In the following some embodiments of the present invention will be described with reference to the figures, wherein.

DETAILED DESCRIPTION OF THE INVENTION

Figure 1:
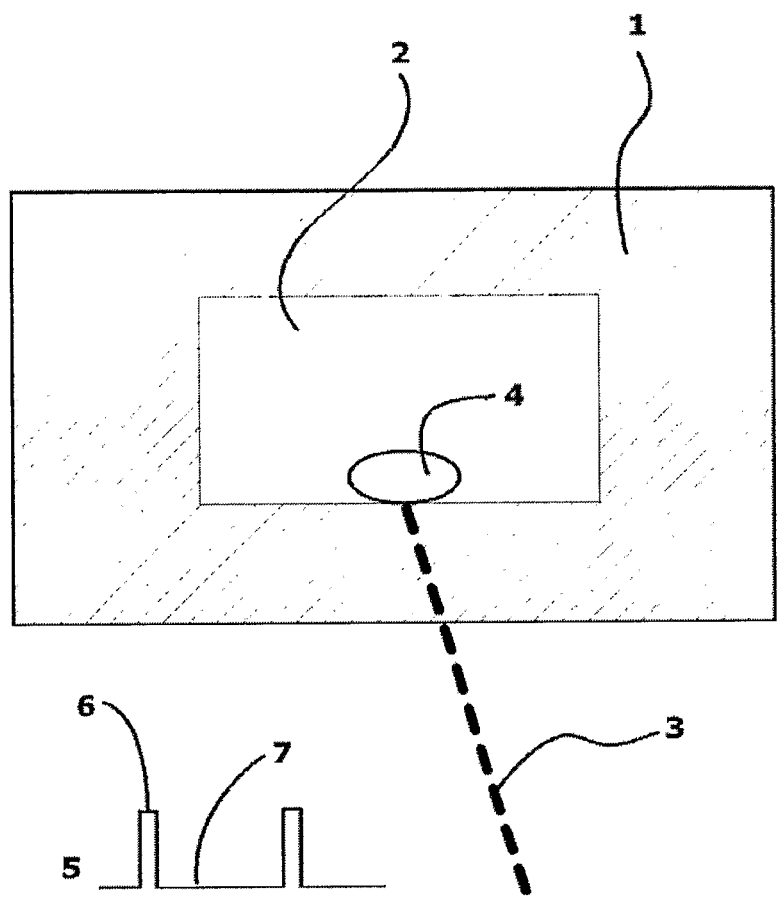
FIG. 1 shows the preferred embodiment of the invention, where laser energy is directed to a confinement containing the liquid media.

An aspect of the present invention relates to a method for generating a pulsating pressure wave (PPW) in a liquid, the method comprising the steps of:
 a) providing a heating means,
 b) heating a part of the liquid with said heating means so as to evaporate the part of the liquid, thus forming a vapour bubble,
 c) condensing the vapour bubble, and
 d) repeating steps b) and c).

In a preferred embodiment of the invention, the PPW is an ultrasonic wave.

The PPW may be generated in a wide array of liquids. For example, the liquid may comprise a solvent selected from the group of water, DMSO, acetone, and alcohol.

Furthermore or alternatively, the liquid may e.g. comprise a non-polar solvent such as benzene, toluene, xylene, heptane, octane, and mixtures thereof.

The alcohol may e.g. be selected from the group consisting of methanol, ethanol, 1-propanol, 2-propanol.

In a preferred embodiment of the invention, the liquid comprises at least 10% (w/w) water such as at least 50% (w/w) or 75% (w/w), and even more preferred at least 90% (w/w) water.

The liquid may e.g. comprise a sample such as a whole blood, serum, plasma, saliva, urine, tissue or components thereof.

In an embodiment of the invention, the liquid is whole blood diluted with an aqueous liquid.

In a preferred embodiment of the invention the liquid is a degassed liquid, such as e.g. degassed water. A degassed liquid may e.g. comprise at most 15 mg dissolved gas per kg liquid such as at most 10 mg, 5 mg, 3 mg, 2 mg, 1 mg, 0.5 mg, 0.1 mg, or 0.05 mg, such as at most 0.01 mg. For example, a degassed aqueous liquid may e.g. comprise at most 15 mg dissolved gas per kg aqueous liquid such as at most 10 mg, 5 mg, 3 mg, 2 mg, 1 mg, 0.5 mg, 0.1 mg, or 0.05 mg, such as at most 0.01 mg.

The liquid may comprise one or more additives. The one or more additives may e.g. be selected from the group consisting of a detergent, a preservative, a pH buffer, a salt, and a water-soluble polymer.

The detergent may e.g. be selected from the group consisting of Tween 20, NP 40, octylphenolpoly(ethyleneglycolether) (Triton X-100), CHAPS, CHAPSO, and sodium dodecylsulfate (SDS).

The preservative may e.g. be sodium azide.

The pH buffer may e.g. be selected from the group consisting of a phosphate buffer, Tris, Mops and a HEPES buffer.

The salt may e.g. be selected from the group consisting of $MgCl_2$, NaCl, KCl, Na-glutamate and K-glutamate.

The water-soluble polymer may e.g. be polyethylene glycol (PEG) and/or polyvinyl alcohol (PVA).

More information about and examples of relevant additives may be found in Sambrook et al. or other general textbooks known to the person skilled in the art.

The term "and/or" used in the context "X and/or Y" should be interpreted as "X", or "Y", or "X and Y".

In a preferred embodiment of the invention the average temperature of the liquid, e.g. an aqueous liquid, during generation of a PPW is in the range of −10° C.-120° C., such as 0° C.-100° C., 10° C.-80° C., and 20° C.-60° C. In a preferred embodiment the temperature of the liquid is in the range of 60° C.-80° C., and even more preferred in the range of 65° C.-75° C., such as e.g. about 71° C. It should be noted that though the average temperature of the liquid typically is in the range of −10° C.-120° C., there may be parts of the liquid that has a higher temperature, e.g. due to the heating via the heating means and/or due to cavitation caused by the PPW.

In an embodiment of the invention the part of the liquid which is evaporated and partially or fully condensed in steps b) and c), respectively, represents a small percentage of the total mass of liquid. The part of the liquid may e.g. be at most 1% of the total mass of the liquid, such as at most 0.5%, 0.1%, or 0.05%, or preferably at most 0.01% of the total mass of the liquid, such as at most 0.005%, 0.001%, 0.0005%, 0.0001%, 0.00005%, or 0.00001%, such as at most 0.000005%.

In a preferred embodiment of the invention the part of the liquid is evaporated by film boiling. Film boiling may be created by heating the part of the liquid sufficiently fast so that the evaporation of a part of the liquid is accomplished almost instantaneous, e.g. in at most 500 μs or preferably in at most 100 μs, 50 μs, 10 μs or 5 μs, such as even more preferred in most 1 μs, 0.1 μs, or 0.01 μs. The fast evaporation typically forms a protective vapour layer serving to protect the remaining part of the liquid from being heated. Preferably, the evaporation of a part of the liquid is accomplished in the range of 0.1 μs-100 μs, such In a preferred embodiment of the invention the liquid is contacting a wall surface of a wall. The wall may e.g. form part of a container comprising the liquid. The container may e.g. be a micro chamber or a micro channel.

A micro chamber typically has a volume of at most 100 μL, such as at most 50 μL, 10 μL, 5 μL, 1 μL, 100 nL, or 10 nL, such as a volume of at most 1 nL. Even smaller micro chamber volumes are envisioned. For example, a micro chamber may have a volume of at most 100 pL, such as at most 50 pL, 10 pL, 5 pL, or 1 pL, such as a volume of at most 0.1 pL. Preferably the micro chamber has a volume of at most 10 nL and even more preferably the micro chamber typically has a volume of at most 1 nL.

In a pepi, the micro chamber has a volume in the range of 0.1 pL-100 μL, preferably in the range of 10 pL-1 μL, and even more preferably in the range of 100 pL-10 nL, such as 0.5 nL, 1 nL, or 5 nL.

The micro chamber may comprise one or more openings, which e.g. may be connected to one or more micro channels.

A micro channel has normally a cross sectional dimension of at most 500 μm, such as at most 250 μm, 150 μm, 100 μm, 75 μm, 50 μm, 25 μm, or 15 μm, such as at most 5 μm. Preferably, the micro channel has a cross sectional dimension of at most 100 μm, and even more preferably the micro channel has a cross sectional dimension of at most 50 μm. A micro channel may have an asymmetric dimension such as e.g. a width of 100 μm and a depth of 50 μm.

Many types of heating means may be employed for heating the part of the liquid. For example, the heating means may be selected from the group consisting of a heating element, and electromagnetic radiation.

The heating element may e.g. be an ohmic heating element, such as a resistor, or it may be part of the liquid, e.g. the liquid having a current conducting property.

The heating element may e.g. be located on the wall surface contacting the liquid or it may be located in the wall.

In a preferred embodiment, the heating element is of micro-size. For example, it may be preferred that the largest dimension of the heating element is at most 1000 μm, such as at most 1000 μm, 500 μm, 250 μm, 150 μm, 100 μm, or 50 μm, such as at most 25 μm.

In a preferred embodiment of the invention, the electromagnetic radiation is a beam of electromagnetic radiation, e.g. a focussed beam such as a focussed laser beam.

The electromagnetic radiation is typically provided by a source of electromagnetic radiation. The source of electromagnetic radiation may be a laser, such as a gas laser, a solid state laser, such as a laser diode (LD), or the light source may be a Light Emitting Diode (LED) a Xenon lamp or any filament bulb of adequate intensity. The laser or LED may be operated in either a pulsed mode or a continuous mode, Xenon lamp or filament bulb may be modulated using mechanical blocking or deflecting means.

The electromagnetic radiation may e.g. be absorbed by the liquid or it may be absorbed by a wall comprising a wall surface in contact with the liquid.

In an especially preferred embodiment of the invention, the electromagnetic radiation is absorbed in the wall surface contacting the liquid. The wall surface may e.g. comprise a layer of a light absorbing material, in which case the remaining part of the wall may act as a non-absorbing carrier of the electromagnetic radiation.

In an embodiment the container, e.g. the micro channel and/or the micro chamber, comprises a transparent window, which is transparent to the wavelength(s) of the electromagnetic radiation. When using electromagnetic radiation comprising a wavelength ranging from 700 nm to 3000 nm, e.g. provided by an infrared laser, the transparent window may e.g. comprise silicon. The transparent window may e.g. comprise glass or plastics that are transparent in the visual wavelength range. For example, red light diode lasers with a central wavelength of e.g. 632 nm, 635 nm, 670 nm, 680 nm or 720 nm may be used.

The light absorbing material may be any material readily absorbing the optical energy emitted from the light source and thus transforming the absorbed light into joule heat. One such material may be aluminium nitride, or especially when silicon is used as a substrate material doped silicon such as boron doped silicon or phosphorus doped silicon, or in a preferred embodiment a polymer containing additives enhancing absorption of specific or multiple wavelengths (e.g. commercially available products from Avecia—UK (PRO-JET830NP), Epolin—US (EpoLight™ 4121), Clearweld—US (LD120) or Treffert—FR).

The light absorbing material may form an integral part of the micro channel wall or micro chamber wall ensuring that the thermal resistance of the wall is sufficiently low to allow a substantial amount of heat to be transferred to the micro channel or micro chamber. The light absorbing material may thus act as a hot plate, for heating liquid e.g. in a micro channel. The light absorbing material may be absorbent to a narrow region of the light spectrum, or it may be completely impermeable and absorbent to any wavelength from UV to MIR (Mid Infra Red)

The light absorbing material may be painted, sprayed, deposited or spotted on the wall and it may form a next layer on the channel wall or be absorbed into the channel wall. The micro channel and/or micro chamber may be formed by a first and a second substrate, said first substrate comprising a transparent window and said second substrate comprising a light absorbing material.

It is preferred that the light absorbing material is chosen so that at least 1% of the intensity of the electromagnetic radiation irradiating the wall surface is absorbed in the light absorbing material, such as at least 2%, 3%, 4%, 5%, 10%, 15%, 20%, 25%, 30%, 35%, 40%, 45%, 50%, 55%, 60%, 65%, 70%, 75%, 80%, 85%, 90%, 95%, or 99%, such as at least 99.99% of the intensity of the electromagnetic radiation.

The vapour bubbles formed by the part of the liquid, which is heated by the heating means, typically reaches a maximum height in the range of 1 µm-200 µm, preferably in the range of 5 µm-50 µm, and even more preferably in the range of 10 µm-40 µm, such as about 25 µm or about 30 µm.

In an embodiment of the invention, a new vapour bubble is formed in every step b). Alternatively the vapour bubble from the previous step c) is not yet fully condensed when the new step b) is initiated and the energy from the new step b) adds new vapour to the existing vapour bubble.

The duration of the heating via the heating means of step b) is typically in the range of 0.1-100 µs, preferably in the range of 0.5-50 µs, and even more preferred in the range of 1-10 µs, In step c) the vapour bubble is cooled, thereby condensing the vapour bubble. The vapour bubble may e.g. be fully condensed during step c), i.e. all the vapour of the vapour bubble reverts to liquid form.

The vapour bubble may be cooled passively, i.e. the energy of the heating means dissipates into the surrounding liquid, and may also into the wall of the micro chamber or micro channel. Passive cooling of the vapour bubble may be accelerated by using a material having a high thermal conductivity, such as the various metals and semiconductors. In an embodiment silicon is a preferred wall material.

The duration of step b) is typically in the range of 1-100 µs, preferably in the range of 5-50 µs, and even more preferred in the range of 10-40 µs, such as 15 µs, 20 µs, 25 µs, 30 µs, or 35 µs.

In an embodiment of the invention, the steps b) and c) are repeated at a fixed frequency.

Also, the steps b) and c) may be repeated at a changing frequency.

In a preferred embodiment of the invention, the steps b) and c) are repeated at a frequency in the range of 0.5-1000 kHz, such as in the range of 10-500 kHz, preferably in the range 15-150 kHz and even more preferably in the range 20-100 kHz or 15-50 kHz.

In a new step b) the vapour bubble may be formed at the same location in the micro channel or micro chamber as the previous vapour bubble was formed during the previous step b). Also, in a new step b) the new vapour bubble may be formed at a location different from the location in the micro channel or micro chamber where the previous vapour bubble was formed during the previous step b).

The new vapour bubble of a new step b) may comprise substantially the same part of the liquid as the previous vapour bubble of the previous step b) did. Alternatively, the vapour bubble may comprise a different part of the liquid than was evaporated in the previous step b).

In an embodiment of the invention, the liquid is flowing through the micro channel and/or the micro chamber. Typical flow rates are in the range of 1 pL-100 µL/minute, preferably in the range of 1 nL-10 µL/minute, and even more preferably in the range of 10 nL-1 µL/minute. Alternatively, the liquid does not flow through the micro channel and/or the micro chamber.

The total duration of a step b) and step c) in a repetition is typically in the range of 1 µS-2 mS, preferably in the range of 2 µS-100 µS, and even more preferably in the range of 10 µS-50 µS, or in the range of 5 µS-20 µS.

In an important embodiment of the invention the PPW causes cavitation in the liquid.

When the intensity of energy of the PWW applied to a liquid exceeds the attractive forces holding together the molecules of the liquid, a phenomenon called cavitation occurs. Cavitation is the formation, growth and collapse through implosion of micro bubbles—not to be confused with the vapour bubble. The implosion of these micro bubbles produces short-lived "hot spots" in the liquid that can release sufficient energy to drive a variety of chemical reactions.

The effect of cavitation may be influenced by a number of factors such as temperature of the liquid, intensity of the PPW, duration of cavitation and the frequency of the PPW.

The key to creating cavitation in a liquid is to overcome the "cavitation threshold", which is the point where the intensity of energy being introduced into the fluid initiates the formation, growth and collapse of the micro bubbles. While different fluids or liquids have varying cavitation thresholds, only the energy applied above the cavitation threshold will contribute to the formation of cavitation.

Thus, in a preferred embodiment of the invention the size and/or liquid displacement of the vapour bubble and the rates for its formation and condensation are sufficient for creating cavitation in the liquid, i.e. the pressure the vapour bubble(s) exert on the liquid upon expansion respectively contraction.

For example, when the heating means is the beam of electromagnetic radiation, the spot area, the effect of the beam, the duration of the heating, the duration of the condensation and the number of repetitions should be sufficient for creating cavitation in the liquid.

Alternatively, if the heating means is a heating element, then the voltage over the heating element, the duration of the heating, the duration of the condensation and the number of repetitions should be sufficient for creating cavitation in the liquid.

The cavitation typically occurs in the vicinity of the part of the liquid that is evaporated. In an embodiment of the invention, it is preferred that the cavitation occurs within a distance of at most 5000 µm from the periphery of the vapour bubble, such as within a distance of at most 2500 µm, 1000 µm, 750 µm, 500 µm, 400 µm, 300 µm, 200 µm, 150 µm, or 100 µm, such as within a distance of at most 50 µm from the periphery of the vapour bubble.

In another embodiment of the invention, the cavitation occurs within a distance of at least 50 µm from the periphery of the vapour bubble, such as within a distance of at least 100 µm, 200 µm, 500 µm, 1000 µm, 2000 µm, or 3000 µm, such as within a distance of at least 5000 µm from the periphery of the vapour bubble.

The maximum size of the vapour bubble is used for the calculation of the distance.

In a further embodiment of the invention, the cavitation occurs within a distance of at most 5000 µm from the centre of spot of the beam of the electromagnetic radiation on the wall surface, such as within a distance of at most 2500 µm, 1000 µm, 750 µm, 500 µm, 400 µm, 300 µm, or 100 µm, such as within a distance of at most 50 µm from the centre of spot of the beam of the electromagnetic radiation on the wall surface.

Typically, the cavitation occurs within a distance in the range of 1 µm-5000 µm from the centre of spot of the beam of the electromagnetic radiation on the wall surface, such as in the range of 1 µm-50 µm, 50 µm-100 µm, 100 µm-250 µm, 250 µm-500 µm, 500 µm-1000 µm, and 1000 µm-5000 µm. It is preferred that the cavitation at least occurs within a distance in the range of 1 µm-250 µm from the centre of spot of the beam of the electromagnetic radiation on the wall surface, such as in the range of 1 µm-100 µm.

In yet another embodiment of the invention, the cavitation occurs within a distance of at least 50 µm from the centre of spot of the beam of the electromagnetic radiation on the wall surface, such as within a distance of at least 100 µm, 200 µm, 500 µm, 1000 µm, 2000 µm, or 3000 µm, such as within a distance of at least 5000 µm from the centre of spot of the beam of the electromagnetic radiation on the wall surface.

In another embodiment of the invention, the cavitation occurs within a distance of at most 5000 µm from the centre of the heating element, such as within a distance of at most 2500 µm, 1000 µm, 750 µm, 500 µm, 400 µm, 300 µm, or 100 µm, such as within a distance of at most 50 µm from the centre of the heating element.

The presence of cavitation may be detected in a number of ways. Cavitation may e.g. be detected using a sensitive microphone. Alternatively cavitation may be detected using a cavitation tracer such as luminol dissolved in water or in glycerol. When exposed to cavitation the cavitation tracer emits light, which may be detected by a sensitive optical detector such as a photomultiplier tube, a cooled CCD array or an avalanche diode. If the heating means is electromagnetic radiation, it may be necessary to filter out the wavelengths of the electromagnetic radiation to detect the light emitted by the cavitation tracer.

A useful luminol solution may be prepared by dissolving luminol (Sigma Chemical Company, USA) in dimethyl sulfoxide (Sigma Chemical Company, USA) at a concentration of $10^{-2}$ M, and, just before use, diluting the solution to a concentration of $1 \times 10^{-5}$ M with a pH 7.4 phosphate buffered saline containing 0.01 M sodium phosphate and 0.15 M sodium chloride. Higher concentrations of luminol may also be used.

Another indicator for cavitation is physical deterioration of plastic surfaces in contact with the liquid. Such deterioration may be detected visually by means of a microscope or by SEM examination.

Yet another method of cavitation detection is to expose a suspension of particles, such as latex particles having a diameter of about 5 µm or erythrocytes, to the PPW, and to inspect the resulting suspension by means of a microscope. If cavitation has occurred in the suspension, sub micrometer debris from destroyed suspended particles is found in the suspension.

In an important embodiment of the present invention, the liquid comprises a particle. For example the liquid may comprise a number of particles such as at least 2 particles, 10 particles, $10^2$ particles, $10^3$ particles, $10^4$ particles, $10^6$ particles, or $10^8$ particles, such as at least $10^{10}$ particles. The liquid may e.g. be a suspension of particles.

The particle may comprise a material selected from the group consisting of an organic polymer, a metal, a metal oxide, an alloy, a magnetic materiel, and a combination of these materials. The metal oxide may be a silicon oxide such as quartz or glass. The organic polymer can be selected from the group consisting of polyethylene glycol-polyacrylamide, poly styrene, poly vinyl chloride, poly vinyl alcohol, polypeptides, poly ethylene, poly propylene and poly methamethacrylate and a combination of these materials. Also, the particle may comprise a composite material having one or more segments with a material as described above.

The particle may e.g. be selected from the group consisting of a biological cell, a micro particle, and a nano particle The particle may e.g. have a longest cross sectional dimension in the range of 1 nm-500 µm. The particle may be a nano particle, i.e. having a longest cross sectional dimension in the range of 1 nm-1000 nm, such as 25 nm-1000 nm, or the particle may be a micro particle, i.e. having a longest cross sectional dimension in the range of 1 µm-500 µm.

In a preferred embodiment of the invention, the particle is a biological cell. That is, the liquid may comprise a biological cell or a suspension of biological cells.

The biological cell may e.g. be a bacterium, a mammalian cell such as a red or white blood cell or a cancer cell. The biological cell may also be a bacterial spore.

Excessive exposure to cavitation may damage the components of the biological cells, i.e. receptors, organelles, proteins and genetic material. In an embodiment of the invention, the liquid comprising biological cell is exposed to the pulsating pressure wave for at most 600 seconds, such as at most 500 seconds, 400 seconds, 300 seconds, 200 seconds, 100 seconds, 50 seconds, 25 seconds, 15 seconds, 10 seconds, 5 seconds, 4 seconds, 3 seconds, 2 seconds, 1 seconds, 0.1 seconds, or 0.01 seconds such as at most 0.001 seconds.

In an important embodiment of the invention, the beam of electromagnetic radiation is a laser beam.

In an embodiment of the invention the largest dimension of the spot of the beam of electromagnetic radiation, where the beam contacts the wall or wall surface contacting the liquid, is at most 1000 µm. Preferably, the largest dimension of the spot of the beam of electromagnetic radiation, where the beam contacts the wall or wall surface contacting the liquid, is at most 500 µm, and even more preferably at most 300 µm, such as 200 µm, 100 µm, 75 µm, 50 µm, 25 µm, 15 µm, 10 µm, or 5 µm, such as at most 1 µm.

Typically, the effect of the beam of electromagnetic radiation, e.g. the laser beam, is in the range of 1 mW-200 W, such as in the range of 1 mW-100 mW, 100 mW-500 mW, 500 mW-1 W, 1 W-20 W, and 20 W-200 W.

The heating of step b) may either be performed by providing a single pulse of electromagnetic radiation during step b) or by providing multiple shorter pulses which accumulated contain the same energy as the single, pulse.

The electromagnetic radiation may be provided by a laser, such as a gas laser, or a solid state laser, such as a laser diode. The electromagnetic radiation may be provided by a Light Emitting Diode (LED), a Xenon lamp or any filament bulb of adequate intensity. The laser or LED may be operated in either a pulsed mode or a continuous mode, Xenon lamp or filament bulb may be modulated using mechanical blocking or deflecting means.

The electromagnetic radiation may comprise a wavelength in the range of 190 nm-5000 nm, such as 190 nm-400 nm, 400 nm-700 nm, 700 nm-1500 nm, and 1500 nm-5000 nm. In a pepi, the electromagnetic radiation comprises a wavelength in the range of 600 nm-800 nm, such as e.g. 631-633 nm, 634-636 nm, 669-671 nm, 679-81, 719-721 nm, or 806-809 nm, and such as 632 nm, 635 nm, 670 nm, 680 nm, 720 nm, or 808 nm.

In a pepi, at least 90%, such as at least 95% or 99%, of energy of the electromagnetic radiation is provided by a wavelength in the range of 190 nm-5000 nm, such as 190 nm-400 nm, 400 nm-700 nm, 700 nm-1500 nm, and 1500 nm-5000 nm. In a pepi, at least 90%, such as at least 95% or 99%, of energy of the electromagnetic radiation is provided by a wavelength in the range of 600 nm-800 nm, such as e.g. 631-633 nm, 634-636 nm, 669-671 nm, 679-81, 719-721 nm, or 806-809 nm, and such as 632 nm, 635 nm, 670 nm, 680 nm, 720 nm, or 808 nm.

Another aspect of the present invention relates to a method of lysing a biological cell in a liquid, the method comprising generating a PPW in the liquid according to the method described herein.

Thus, the invention relates to a method of lysing a biological cell in a liquid, the method comprising the steps
  a) providing a heating means,
  b) heating a part of the liquid with said heating means so as to evaporate the part of the liquid, thus forming a vapour bubble,
  c) condensing the vapour bubble, and
  d) repeating steps b) and c),
so as to form a PPW in the liquid, said PPW lysing the biological cell.

In a preferred embodiment of the invention the PPWs is controlled so as to form cavitation, as described herein, in the liquid.

The method of lysing a biological cell or the method of generating a PPW may furthermore comprise the step:
  e) analysing a component of the lysed biological cell.

The components of the lysed biological cell may e.g. be analysed by means of the systems and methods described in the PCT application WO 2004/016 948, which is incorporated herein by reference.

The analysis of the component of the lysed biological cells may e.g. comprise electrophoresis techniques, such as capillary electrophoresis (CE); nucleic acid amplification techniques such as PCR; immunoassays. These and other relevant analysis techniques are described in further detail in Sambrook et al.

The analysis of the component of the lysed biological cells may comprise one or more methods of optical analysis, e.g. a method selected from the group consisting of UV-spectroscopy, VIS-spectroscopy, NIR-spectroscopy, IR-spectroscopy, and fluorescence detection.

Yet an aspect of the invention relates to a method for deagglomerating particles in a liquid, the method comprising generating a PPW in the liquid according to the method described herein.

The term "deagglomerating particles" means breaking up and/or re-dispersing agglomerated particles as single particles or smaller aggregates of particles.

Thus, the invention relates to a method for deagglomerating particles in a liquid, the method comprising the steps
  a) providing a heating means,
  b) heating a part of the liquid with said heating means so as to evaporate the part of the liquid, thus forming a vapour bubble,
  c) condensing the vapour bubble, either partly of fully, and
  d) repeating steps b) and c),
so as to form a PPW in the liquid, said PPW deagglomerating the particles.

A special aspect of the invention relates to a method of generating a pulsating pressure wave in a liquid comprises the following steps:
  i) providing a localized heating of a part of said liquid such that said part of said liquid is brought to a vapour state, said vapour displacing a volume of the remaining liquid upon expansion;
  ii) removing/switching off the source of heat, allowing the generated vapour to cool and condense and contract;
  iii) repeating steps i) and ii) with a fixed frequency;
thus the repeated generation of a vapour bubble, respectively the collapse of said vapour bubble, will act as an oscillating mechanical transducer on the liquid medium. When the frequency of oscillation is in the ultrasonic region (above 12-15 kHz) cavitation will occur in the liquid—causing micro bubbles with very high internal pressures to form. The high pressures of the micro bubbles will cause disruption of solid components suspended in the liquid. A suspended component may be a somatic cell or a bacterial spore, where the cell membrane—respectively—the bacterial shell, will disrupt upon being exposed to cavitation effects, and ultimately releasing intercellular or intersporal content such as e.g. DNA material.

A number of methods can be applied to deliver the localized heating to produce the vapour bubbles. In an embodiment an ohmic heating element (a resistor) may be placed in direct contact with the liquid media. Controlling electronics will drive the heating element. In a preferred embodiment the heat is applied by an external source from where it is directed to the position where the bubble formation is intended. Any form of electromagnetic energy may be directed to that position.

In a preferred embodiment a laser beam is directed to a part of the body in which the liquid media is enclosed, thus providing a concentrated energy at a desired position. The laser energy may be absorbed and transformed into joule heat in a special interface layer. The laser energy may also be transformed into joule heat in the liquid itself, e.g. using a suitable lasing wavelength that will exhibit high absorption in the liquid media. The concentrated energy will heat up the liquid in connection with the location and cause immediate vapour transition. Turning off the laser beam will cause fast cooling of the heated location and subsequently the formed vapour bubble will condense and collapse. The source of laser radiation can controlled precisely using an ordinary electronic control system. Said control system will be able to control the heating pulse period as well as the intermittent off period. Effectively different frequencies as well as pulsed operation can be implemented by the electronic control system.

A preferred frequency of operation for the lysing of somatic cells is in the region 15-40 kHz (e.g. 20 kHz) but lower frequencies (e.g. audible frequencies 1-15 kHz) may be produced, as well as higher frequencies.

In another embodiment of the invention the ultrasonic frequency is applied for only a short period of time followed by a period of no ultrasonic activity. The short period of operation will cause cavitation in the liquid, but due to the subsequent period of no activity the suspended components (e.g. cells and/or cell walls) will not be permanently disrupted. However the activity will cause the cells to declot or deagglomerate. Especially powders (e.g. nano-powders) of sub-micrometer size will tend to clot/agglomerate when in liquid suspension; the influence of ultrasonic bursts will make them deagglomerate.

In a preferred embodiment the liquid media is contained in a micro-fluidic system, thus a part of a liquid with suspended components may by subjected to the ultrasonic effect in a part of a micro channel or a microchamber of sub millimetre dimensions. Ohmic heating elements may be implemented in the micro-fluidic system as previously described. In a preferred embodiment a software controlled laser beam is directed to a discrete location of a micro channel or microchamber and the bubble formation and collapse—respectively the generation of ultrasound—will act on only a small selected part of the enclosed liquid. The laserbeam may be directed from an X or X-Y scanning device (e.g. a galvanometer) such that any part of a microfluidic system (or chip) can be selectively influenced by the laser beam. In one embodiment the laser beam may be repeatedly scanning an area or a length of a channel, while continuously producing ultrasound as described, thus a larger area or volume of liquid may be subjected to the sonication effect.

FIG. 1 shows the preferred embodiment of the invention, where laser energy is directed to a confinement containing the liquid media. The confinement body (1) holds the confinement or chamber or channel cross-section (2). The laser beam (3) is directed to the chamber through the translucent body material. The laser energy is absorbed and transformed to heat in the interface between body material and liquid media, resulting in the formation of an expanding vapour bubble (4). The expanding bubble will exert a substantial pressure on the enclosed liquid media. The adjacent diagram (5) illustrates the laser pulse (6)—the laser "on-time", followed by the intermittent pause (7)—the laser "off-time". During the laser "off-time" the vapour bubble will cool of, condense and contract and thus influence the liquid with a negative pressure. The cycle is repeated according the description, resulting in the liquid media experiencing a pulsating pressure with a frequency identical with the frequency of the laser pulse being switched on respectively switched off.

Figure 2:
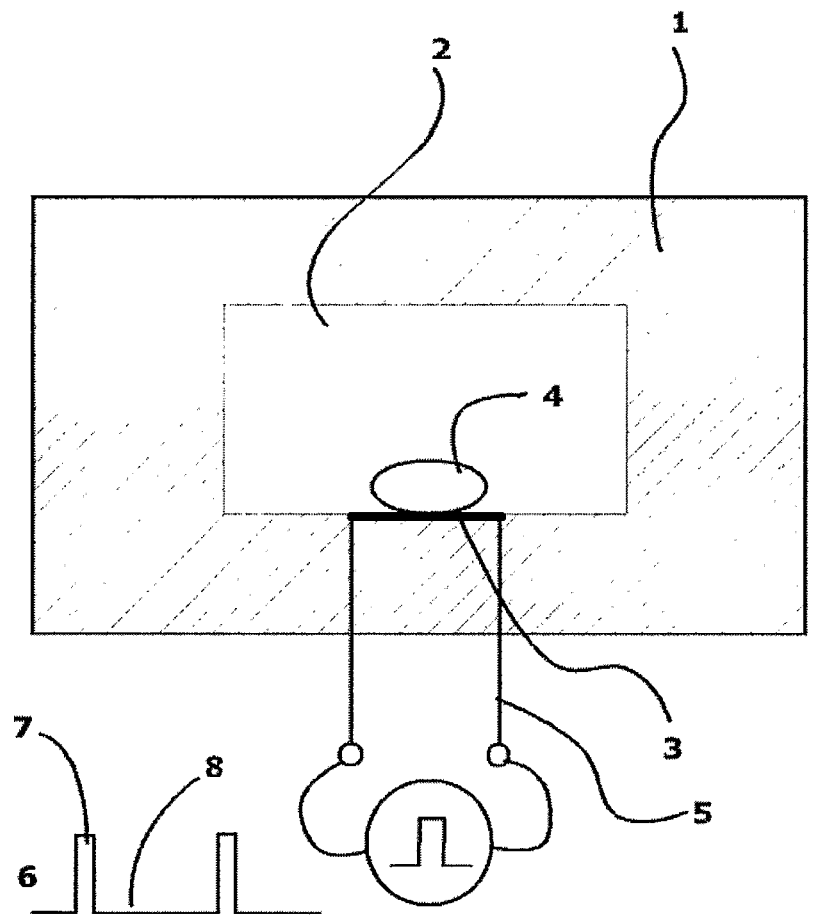
FIG. 2 shows the embodiment where an encased heating element is employed.

FIG. 2 shows the embodiment where an encased heating element is employed. The confinement body (1) holds the confinement or chamber or channel cross-section (2). The heating element (3) is electrically connected to through the leads (5) to the pulse generating control electronics. The heating element is turned on respectively turned off according to the timing diagram (6). Bubble generation and collapse will follow the explanation above (as described under FIG. 1 detailed description)

Figure 3:
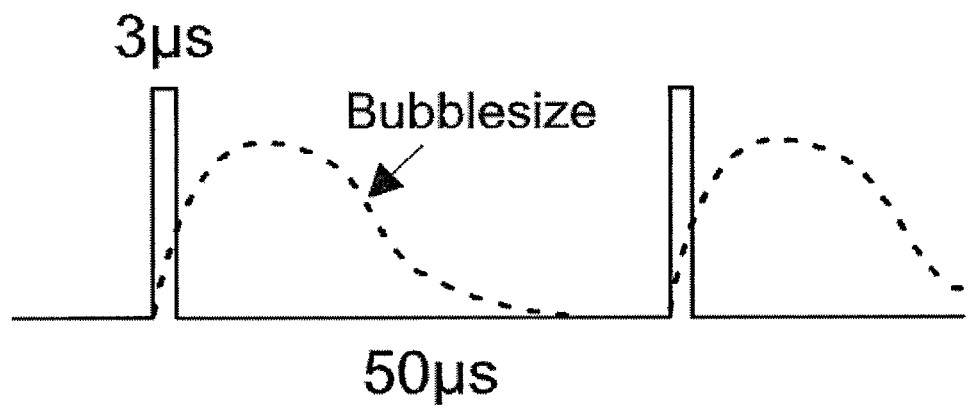
FIG. 3 shows a timing diagram of the heater/laser cycling and the resulting bubble formation and extinction in an example mode of operation producing 20 kHz ultrasonic waves.

FIG. 3 shows a timing diagram of the heater/laser cycling and the resulting bubble formation and extinction in an example mode of operation producing 20 kHz ultrasonic. As illustrated the laser or the heating element is activated for 3 µs during a period of 50 µs ("off-time" is 47 µs). The dotted line illustrates the bubble growth. The bubble will grow for a period after extinction of the heat source; it will reach a maximum size, where after it will collapse and return to its original liquid state. The resulting ultrasound frequency given by the 50 µs period will be 20 kHz.

Special embodiment 1 is the method of generating a pulsating pressure wave in a liquid, the method comprising
  i) providing a localized heating of a part of said liquid such that said part of said liquid is brought to a vapour state, said vapour displacing a volume of the remaining liquid upon expansion;
  ii) removing/switching off the source of heat, allowing the generated vapour to cool and condense and contract;
  iii) repeating steps i) and ii) with a fixed frequency.

Special embodiment 2 is the method according to special embodiment 1, wherein the localized heating is provided from a source with no mechanical connection with the liquid.

Special embodiment 3 is the method according to special embodiment 2, wherein the source of localized heating is an optical beam.

Special embodiment 4 is the method according to special embodiment 3, wherein the optical beam is a laser.

Special embodiment 5 is the method according to special embodiment 1, wherein the source of localized heating is an electrically driven heating element.

Special embodiment 6 is the method according to special embodiment 1, wherein the frequency of repetition is an ultrasonic frequency.

Special embodiment 7 is the method according to special embodiment 5, wherein the ultrasonic frequency causes cavitation in the liquid.

Special embodiment 8 is the method according to special embodiment 1, wherein the liquid contains a suspended component, e.g. a cellular component such as blood cells or bacterial spores.

Special embodiment 9 is the method according to special embodiment 7 and 8, wherein the pulsating pressure wave will cause disruption of said suspended component or part of; e.g. breaking of cell wall.

Special embodiment 10 is the method according to special embodiment 8, wherein the pulsating pressure wave is applied for a number of short periods with intermittent pauses, the length of the periods be adjusted such that deagglomeration of clumping suspended components (e.g. cells, beads or pellets) occur.

Special embodiment 11 is the method according to special embodiment 10, wherein the suspended component is a nano-powder.

Special embodiment 12 is the method according to special embodiment 1, wherein the liquid is contained in a micro channel or a micro chamber, e.g. a micro channel or a micro chamber of sub millimetre dimensions.

Special embodiment 13 is the method according to special embodiment 3, wherein the optical energy is delivered using a one or two-dimensional optical scanning device (e.g. a galvanometer)

Special embodiment 14 is the method according to special embodiment 3, wherein an absorbing part is included in immediate connection with the liquid media, where it will absorb the optical energy and transform it into joule heat.

It should be noted that, according to the present invention, embodiments and features described in the context of one of the aspects of the present invention also apply to the other aspects of the invention.

EXAMPLE

The present invention has been experimentally tested and verified as described in this example.

A 2 mm poly-ethylene (PE) substrate was micro machined using an Excimer laser. A channel structure of dimensions 100 µm wide and 25 µm deep was machined. A 2 mm PE lid was prepared with a infra-red absorbing dye (PRO-JET830NP, Avecia, the United Kingdom) such that one surface of said lid would exhibit strong absorption of infra-red radiation, eventually transforming infra-red light into joule heat in said surface part. The lid was welded onto the before mentioned channel structure with the infra-red absorbing side forming the fourth wall of the channel-structure.

A focussed laser-beam (stemming from a high-power commercially available laser diode (LD)-500 mW, 808 nm) was directed towards the substrate from the opposing side of a camera-microscope installation. The LD was electronically controlled such that pulse and period-length could be adjusted and controlled.

The channel-structure was filled with anticoagulated human blood in an isotonic saline solution; 20% whole blood per 80% saline (volume percent)

The focussed laser-beam was adjusted to run with a pulse width of 3 µs followed by a 47 µs period of no activity, thus producing a frequency of repetition of 20 kHz, the timing diagram of the laser cycle is shown in FIG. 3. The laser-cycle was initiated from the controlling software, and physical turmoil in the liquid was recognized immediately. The liquid turmoil was clearly identified from the movement of illuminated erythrocytes. Within less than a second the suspended blood cells was lysing in an area immediately around the laser-beam. During the following 3 seconds all cells in a region of the channel of about 150 µm were lysed and further 2 seconds of laser pulsing did not cause the effect to propagate further into either direction of the channel.

After the laser activity was halted the following was observed: A "cloud" of material was observed around the area where the ultrasonic activity took place. Further a permanent deterioration or transformation of the polymer in the area around where the activity occurred was clearly identified, as the area exhibited a milky translucent appearance. This permanent deterioration of polymer surfaces is a common indicator of high powered ultrasonic activity.

Observing the still liquid filled channel structure under a high magnification microscope revealed small clusters of sub-micron debris, only present at locations in the channel that were subjected to the laser activity. The debris was fluctuating due to "Brownian motion", thus indicating sub-micrometer size. Further it was observed that no "empty" cells were present in the solution after being subjected to the process. Empty cells (erythrocytes) without their distinct haemoglobin content would indicate haemolysis from increased temperatures or from any changes in solution properties (e.g. pH, saline concentration etc.) This is a clear indication the ultrasonic lysis caused the suspended cells to dissolve.

References

Sambrook et al: Molecular cloning: a Laboratory Manual: 3nd edition, Volume 1 and 2, Sambrook et al., 2001, Cold Spring Harbor Laboratory Press

The invention claimed is:

1. A method for lysing biological cells in a liquid comprising:
   (a) placing biological cells in a liquid,
   (b) generating an ultrasonic pulsating pressure wave (PPW) in the liquid, the method comprising the steps of:
      (i) heating a localized part of the liquid with a laser beam of electromagnetic radiation having a diameter of at most 500 µm such that the part of the liquid is brought to a vapour state and thereby creating a vapour bubble displacing a volume of the remaining liquid upon expansion;
      (ii) removing/switching off the source of heat, allowing the generated vapour bubble to cool and condense and contract; and
      (iii) repeating steps (i) and (ii) with a frequency of at least 12 kHz; wherein the size of the vapour bubble and the rates for its formation and condensation is sufficient for creating cavitation in the liquid, so as to lyse the biological cells.

2. The method according to claim 1, wherein the laser has power in the range of 1 mW-200 W.

3. The method according to claim 1, wherein the electromagnetic radiation is absorbed in a wall in contact with the liquid.

4. The method according to claim 1, wherein the electromagnetic radiation is absorbed in the liquid.

5. The method according to claim 1, wherein the steps (i) and (ii) are repeated at a fixed frequency.

6. The method according to claim 1, wherein the steps (i) and (ii) are repeated at a changing frequency.

7. The method according to claim 1, wherein the frequency is 15-40 kHz.

8. The method according to claim 1, wherein the frequency is 15-150 kHz.

9. The method according to claim 1, wherein the frequency is 20-100 kHz.

10. The method according to claim 1, wherein the frequency is less than 1000 kHz.

11. The method according to claim 1, wherein the liquid is contained within a micro channel or a micro chamber.

12. The method according to claim 1, wherein the liquid comprises a solvent selected from the group consisting of water, DMSO, acetone, an alcohol, and a non-polar solvent.

13. The method according to claim 1 further comprising the step of analysing a component of the lysed biological cells.

* * * * *